(12) United States Patent
Silver et al.

(10) Patent No.: US 8,260,652 B1
(45) Date of Patent: Sep. 4, 2012

(54) METHOD AND APPARATUS FOR DETERMINING AND UTILIZING A TIME-EXPANDED DECISION NETWORK

(75) Inventors: Matthew Silver, Boston, MA (US); Olivier de Weck, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1280 days.

(21) Appl. No.: 11/969,617

(22) Filed: Jan. 4, 2008

Related U.S. Application Data

(60) Provisional application No. 60/879,473, filed on Jan. 9, 2007.

(51) Int. Cl.
G06Q 10/00 (2012.01)
G06Q 40/00 (2006.01)
G06F 9/455 (2006.01)
G07F 19/00 (2006.01)
H04M 15/00 (2006.01)
G06Q 30/00 (2012.01)

(52) U.S. Cl. ........... 705/7.28; 716/132; 705/34; 705/35; 705/36; 705/37; 705/308

(58) Field of Classification Search ................ 705/1–14, 705/400; 1/1; 716/104
See application file for complete search history.

(56) References Cited

U.S. PATENT DOCUMENTS

| | | | |
|---|---|---|---|
| 6,219,654 B1 * | 4/2001 | Ruffin | 705/400 |
| 6,408,428 B1 * | 6/2002 | Schlansker et al. | 716/104 |
| 6,526,387 B1 * | 2/2003 | Ruffin et al. | 705/7.29 |
| 6,735,596 B2 * | 5/2004 | Corynen | 1/1 |

OTHER PUBLICATIONS

Hakan Erdogmus, Comparative Evaluation of Software Development Strategies Based on Net Present Value, Mar. 1999, National Research Council of Canada, 1-7.*
Siddiqi et al., Reconfigurability in Planetary Surface Vehicles: Modelling Approaches and Case Study, Dept. of Aeronautics and Astronautics, Dept. of Mechanical Engineering, Massachusetts Institute of Technology, Cambridge, MA.
Smaling et al., Assessing Risks and Opportunities of Technology Infusion in System Design, Systems Engineering, vol. 10, No. 1, 2007, Wiley Periodicals, Inc.
Silver et al., Time-Expanded Decision Networks: A Framework for Designing Evolvable Complex Systems, Systems Engineereing, vol. 10, No. 2, 2007, Wiley Periodicals, Inc.
de Weck et al., Optimal reconfiguration of satellite constellations with the auction algorithm, Acta Astronautica 62, 2008, 112-130.
Siddiqi et al., Reconfigurability in planetary surface vehicles, Acta Astronautica 64, 2009, 589-601.
Griffin et al., Change Propagation Analysis in Complex Technical Systems, Journal of Mechanical Design, vol. 131, Aug. 2009.

(Continued)

*Primary Examiner* — Jason Dunham
*Assistant Examiner* — Zahra Elkassabgi
(74) *Attorney, Agent, or Firm* — Chapin IP Law, LLC

(57) ABSTRACT

A method, apparatus and computer program for determining and utilizing a time-expanded decision network is presented. A set of potential system configurations is defined. Next, switching costs are quantified to create a "static network" that captures the difficulty of switching among these configurations. A time-expanded decision network is provided by expanding the static network in time, including chance and decision nodes. Minimum cost paths through the network are evaluated under plausible operating scenarios. The set of initial design configurations are iteratively modified to exploit high-leverage switches and the process is repeated to convergence. Time-expanded decision networks are applicable, but not limited to, the design of systems, products, services and contracts.

21 Claims, 16 Drawing Sheets

OTHER PUBLICATIONS

Suh et al., Technology Infusion for Complex Systems: A Framework and Case Study, Systems Engineering vol. 13, No. 2, 2010, Wiley Periodicals, Inc.

Kalligeros et al., Flexible design of commercial systems under market uncertainty: framework and application, 10th AIAA/ISSMU Multidisciplinary Analysis and Optimization Conference, Aug. 30-Sep. 1, 2004, Albany, NY.

Haberfellner et al., Agile Systems Engineering versus Agile Systems Engineering, 15th Annual Int'l Symposium of the Int'l Council on Systems Engineering (INCOSE) Jul. 10-15, 2005.

de Weck, Engineering Systems, Chapter 4, Life-Cycle Properties of Engineering Systems: the ilities.

Suh et al., Flexible Product Platforms: Framework and Case Study, Massachusetts Institute of Technology, Engineering Systems Division.

de Neufville et al., Uncertainty Management for Engineering Systems Plannings and Design, Engineering Systems Symposium, Mar. 29-31, 2004.

* cited by examiner

250

Estimating SDV Switching Cost

| Sub-system | Shuttle Derived DDT&E (Facilities) | | | |
|---|---|---|---|---|
| | Inline Baseline | Inline 5seg | SM Baseline | SM 5seg |
| Launch Pad | 90 | 90 | 80 | 80 |
| VAB Integration | 160 | 160 | 10 | 10 |
| VAB Storage | 0 | 0 | 0 | 0 |
| Mod MLP | 300 | 300 | 10 | 20 |
| New MLP | 0 | 0 | 0 | 0 |
| Crawler Transportation | 0 | 0 | 0 | 0 |
| Launch Control Center per CR | 12 | 12 | 12 | 12 |
| LCC Backrooms | 4 | 4 | 4 | 4 |
| Payload Canister | 10.5 | 10.5 | 0 | 0 |
| Payload Transporter | 9 | 9 | 5 | 5 |
| SSPF | 3.5 | 3.5 | 0 | 0 |
| GSE | 50 | 50 | 50 | 50 |
| Stacking Safe Haven Facility | 0 | 250 | 0 | 250 |
| Software | 200 | 200 | 100 | 100 |
| Hardware | 100 | 100 | 200 | 200 |
| Surge Building | 0 | 3 | 0 | 3 |
| Total | 939 | 1192 | 471 | 734 |

☐ Inline/Sidemount Difference
▨ 4seg/4seg Difference

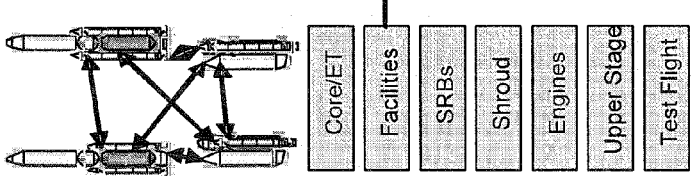

FIGURE 9

METHOD AND APPARATUS FOR DETERMINING AND UTILIZING A TIME-EXPANDED DECISION NETWORK

CROSS REFERENCE TO RELATED APPLICATIONS

The present application claims the benefit of U.S. Provisional Patent Application No. 60/879,473, filed on Jan. 9, 2007, which is incorporated herein by reference in its entirety.

GOVERNMENT RIGHTS

This invention was made with government support under grant number NNKO5OA50C awarded by NASA. The government has certain rights in this invention.

BACKGROUND

There is increasing recognition that adaptability and changeability are critical determinants of the long-term effectiveness and, in relevant cases, profitability of complex technical products, contracts, organizations, and systems. Many complex products, contracts, organizations and systems exhibit high degrees of lock-in making them difficult to adapt and manage in the face of environmental change and uncertainty, and by extension hindering adaptability. For large-scale technical systems, factors which contribute to non-adaptability are considered as switching costs, which are weighed—whether formally or informally—against the benefits of switching to new systems, products, contracts or operating procedures. Switching costs can be real dollars, or quantifiable costs associated with personnel considerations, political implications, or the time it takes to switch. They are further associated with what might be called switching risk.

Increasing the adaptability or flexibility of a system demands lowering future switching costs before the environmental changes which demand a switch arise. System designers should mitigate the causes of architectural lock-in at the design stage, before systems are fielded. Much recent research has addressed the need to design for flexibility and methods to design for it. Real Options Analysis for example, is a method of valuing system flexibility by framing system design in terms of stock-option theory. Similarly, the concepts of Spiral or Evolutionary Development emphasize the need for continual development and improvement of large systems rather than all-at-once development and operation. At their core, these methods seek either ways of systematically and strategically identifying the benefit of various kinds of flexibility and introducing it at the design stage, or delaying critical design decisions until environmental uncertainties are resolved.

SUMMARY

Conventional mechanisms such as those explained above suffer from a variety of deficiencies. One such deficiency is that techniques to implement them including, but not limited to, binomial lattice methods, can be complicated and difficult to implement practically. Another deficiency is that they can oversimplify the problem and lead to erroneous conclusions. Most such methods fail to account for the fundamental problem that many complex systems exhibit high degrees of architectural lock-in making them difficult to adapt and manage in the face of environmental change and uncertainty. and by extension hindering adaptability. Lock-in has been the subject of much research in various fields including engineering (dominant design), economics and politics and other topics concerned with systems design and innovation management. The exact causes of lock-in are generally acknowledged to be multidimensional, taking root in socio-technical issues such as network externalities, the cost of learning new technologies and operating procedures, the risks associated with switching to new systems, the trade-off between operating slightly inefficient fielded technologies and developing new technologies, and broader issues associated with political and organizational inertia.

Embodiments of the invention significantly overcome such deficiencies and provide mechanisms and techniques that identify and quantify switching costs, creating an optimization model based on the concept of a time-expanded network, and running this model under probabilistic or manually generated demand scenarios to identify optimal designs.

Time-expanded Decision Network (TDN) comprises a new methodology and associated modeling tools to design "evolvable" complex systems. Given their size and long-life cycles, complex technical systems are best characterized as operational organizations evolving in the face of exogenous uncertainty, able to take various development paths when confronted with environmental change, rather than fixed sets of technical components. In a nod to information theory, the determinant of a system's "evolvability" is a function of the number of possible states that it might take, rather than the state it is in, with the crucial caveat that alternating between states incurs a switching cost. TDN presents a method to clearly and rigorously represent feasible paths and, to the extent possible, quantifying expected switching costs. These paths and costs can then be represented on a directed network with arc-costs representing cost-elements incurred during system inception and operation, and expanded through a life-cycle using standard methods from network theory, called a time-expanded network. Once formulated, designers can use the time-expanded decision network to conduct scenario planning and iteratively design more evolvable complex systems.

While the sources of architectural lock-in are multi-dimensional, from an economic perspective lock-in stems from high capital expenses (capex), whether monetary or not, associated with switching to new system configurations. Stated differently, lock-in will occur if the cost of switching from one system configuration to another exceeds the expected benefits, discounted at some rate and assuming a level of risk. In order to design for adaptability, switching costs should be lowered. This requires determining how can switching costs be quantified and, once quantified, how systems can be designed to diminish the appropriate elements of switching costs in order to improve life-cycle adaptability and, by extension, performance.

In a particular embodiment of a method for determining and utilizing a time-expanded decision network, the method includes designing a set of feasible system configurations and quantifying switching costs among the system configurations. The method further includes creating a static network defining the system configurations by quantifying the switching costs and creating a time expanded network based on the static network. Additionally the method includes creating operational scenarios for the time-expanded network and evaluating optimal paths through the time expanded network. The method further includes modifying system configurations to leverage easier switching between the system configurations.

Other embodiments include a computer readable medium having computer readable code thereon for determining and utilizing a time-expanded decision network. The computer readable medium includes instructions for designing a set of feasible system configurations and instructions for quantifying switching costs among the system configurations. The computer readable medium further includes instructions for creating a static network defining the system configurations by quantifying the switching costs and instructions for creating a time expanded network based on the static network. Additionally the computer readable medium includes instructions for creating operational scenarios for the time-expanded network and instructions for evaluating optimal paths through the time expanded network. The computer readable medium further includes instructions for modifying system configurations to leverage easier switching between the system configurations.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for determining and utilizing a time-expanded decision network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for determining and utilizing a time-expanded decision network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a computer system. Another embodiment of the invention is as a web service over the Internet. The method can be implemented in any computer language including, but not limited to generic languages such as C++, Java, Matlab, Pearl and Python and also system design and architecting languages such as executable Object Process Networks. The features of the invention, as explained herein, may be employed in computer systems and/or software systems for such systems.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 depicts a matrix showing different switching costs as a function of the level of commonality among launch vehicle configurations;

DETAILED DESCRIPTION

The TDN methodology involves identifying and quantifying switching costs, creating an optimization model based on the concept of a time-expanded network, and running this model under probabilistic or manually generated demand scenarios to identify optimal designs. TDN is, in effect, a method to run "quantitative scenario planning" for system design, in which system responses are encoded through a time-expanded network. The crux lies in identifying how and where switching costs are incurred and how these can be lowered in order to maximize adaptability and, perhaps more importantly, determining exactly how much one should be willing to spend to lower these switching costs at the development stage.

Figure 1:
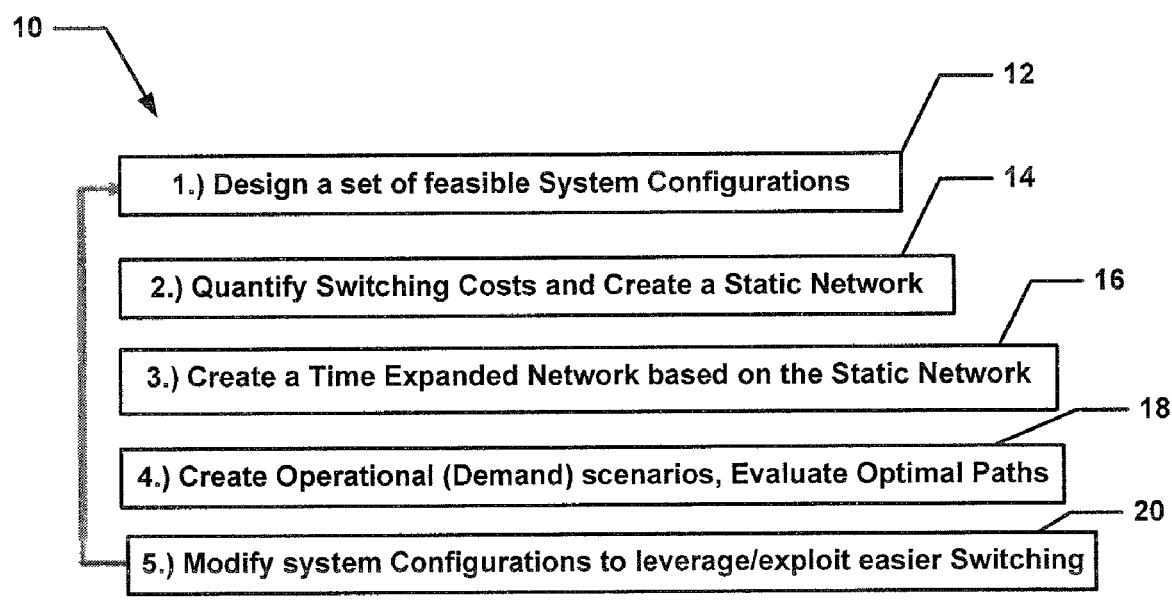
FIG. 1 depicts a flow diagram of a particular embodiment of a method for determining and utilizing a time-expanded decision network.

TDN utilizes the following nomenclature:
$C_{LCi}$=estimated lifecycle cost of the i-th system configuration (design)
$C_D$=cost of RDT&E (research, development, testing and evaluation)
$C_F$=fixed recurring cost per time period
$C_V$=variable cost as a function of demand per time period
$C_{SW}$(A, B)=cost of switching from A to B
$C_{DEV}$(B)=RDT&E of the new system configuration B
$C_R$(A)=cost of retiring the old system A
$D_{i,j}$=demand for system configuration i during period j
r=discount rate
T=number of time steps considered
$\Delta T$=time step Referring now to FIG. 1, a particular embodiment of a method 10 for determining and utilizing a time-expanded decision network (TDN) is shown. The method 10 begins with processing block 12 in which a set of potential system configurations is defined. Next, as shown in processing block 14, switching costs are quantified to create a "static network" that captures the difficulty of switching among the configurations defined in processing block 12. Processing block 16 recites that a time-expanded decision network is provided by expanding the static network from block 14 in time, including chance and decision nodes. Minimum cost paths through the network are evaluated under plausible uncertain operating scenarios, as shown in processing block 18. Finally, as shown in processing block 20, the set of initial design configurations are modified to exploit high-leverage switches and the process is repeated to convergence.

These steps are described in more detail below, using a generic example of designing a system with three potential instantiations (configurations) and then implemented in the context of launch vehicle design and operations.

The first step involves creating a family or set of independent designs. This can be a core platform with options to expanded or wholly unrelated point designs. Once conceptual design configurations have been defined, the basic elements of life-cycle cost for each point design can be estimated. These include research, development, testing and evaluation (RDT&E), fixed recurring cost during operations (independent of demand), and variable recurring cost during operations (dependent on demand).

RDT&E generally includes research, design, analysis, testing of subsystems, system integration, system tests, and construction of any ground equipment and facilities. Fixed recurring costs are those incurred regardless of demand and/or expected changes in the operating environment, including labor, facilities, overhead. For large, complex systems, labor is usually a driver for fixed recurring cost. Variable recurring cost is a function of the demand during a given year or time period. Variable recurring cost includes operating costs, production materials, and variable labor costs, among other elements. Models of variable recurring cost often take into account benefits of learning, which reduces cost per unit as a function of cumulative production levels.

Regardless of how these three traditional cost-elements are modeled, they are generally used to estimate life cycle cost, $C_{LCi}$, of a given design i, as a function of the number of periods T, and the demand in each period, $D_{i,j}$:

$$C_{LCi}(D, T) = C_{Di} + C_{Fi} \times T + \sum_{j=1}^{T} C_{Vi}(D_{i,j}) \quad (1)$$

Note that discounting (time value of money) could be included, which leads to:

$$C_{LCi}(D, T) = C_{Di} + \sum_{j=1}^{T} \frac{C_{Fi} + C_{Vi}(D_{i,j})}{(1+r)^j} \quad (2)$$

Once a set of system configurations (e.g. a family of potential launch vehicles) has been designed, and the three traditional cost-elements (RDT&E, fixed, variable) established for each point design, the cost of switching between these system configurations is identified. As noted, switching costs are difficult to quantify because they combine direct production costs as well as indirect organizational and political costs associated with learning and changing established operating procedures. Switching costs comprehend two principal elements, the technical cost associated with altering and producing a new configuration and/or technology, and a premium for organizational change.

The first element includes the cost of designing, building, and testing the new system ($C_{DEV}$) and the cost of retiring the old system ($C_R$). Thus, the technical cost of switching from configuration A to B is the cost of developing B, plus the cost of retiring A:

$$C_{SW}(A, B) = C_{DEV}(B) + C_R(A) \quad (3)$$

The key assumption is that A and B will not operate concurrently, however, there is commonality between A and B—that is, if A and B share common subsystems or are based on common platforms—and must be estimated using more detailed analysis of which subsystems are re-used and which must be changed. The premium for organizational change is optional, but can be a linear function of the number of people involved in designing and operating the technology. As a whole, adequately quantifying switching costs is a difficult problem, which merits further study. One example is presented below, in the context of launch system design.

Once switching costs between system configurations have been estimated they can be placed in a matrix, with original system configurations ("from") on the rows and new system configurations ("to") as the columns. To take a generic example, imagine three possible point designs for a given system: A, B, C.

TABLE 1

Example switching costs between systems A, B and C

| Switching Cost From | To A | To B | To C |
|---|---|---|---|
| A → | 0 | $C_{SW}$(a, b) | $C_{SW}$(a, c) |
| B → | $C_{SW}$(b, a) | 0 | $C_{SW}$(b, c) |
| C → | $C_{SW}$(c, a) | $C_{SW}$(c, b) | 0 |

The costs of switching from each to each, $C_{SW}$(x, y) is placed in a matrix. Numbers at each cell in the matrix represent the cost of switching from the ith row (configuration) to the jth column (configuration). The matrix is not necessarily symmetric.

This matrix is formally equivalent to what is called a node-node adjacency matrix in graph theory, and network flow theory more generally. That is, the matrix of switching costs defines a network whose nodes are the point-designs (configurations) and whose arc weights are the switching costs according to Equation 3. The resulting graph 50 is represented in FIG. 2.

Figure 2:
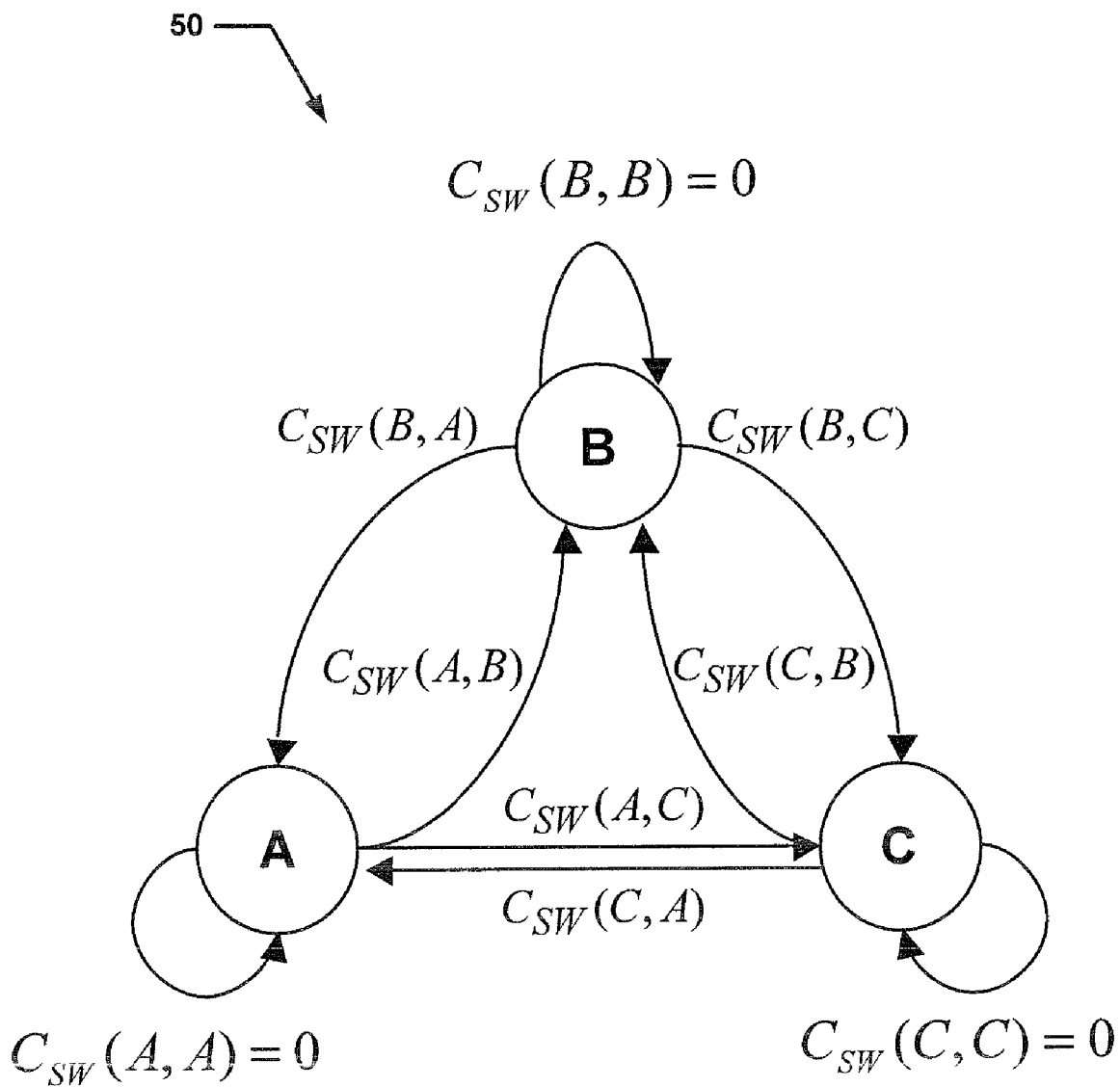
FIG. 2 depicts a graph of a partial static network.

The representation 50 of FIG. 2 is referred to as a "static network." It covers all possible switches between the three systems at any given point in time. Because all n nodes in the graph are connected to all nodes as well as to themselves, as a rule the number of arcs in this static network will be $n^2$. It is important to note that the switching cost associated with staying in a given system configuration (at the same node in the static network) is zero. This does not mean that the cost for keeping the system operating in that configuration is zero—there are still fixed and variable recurring costs in each time period.

To frame the system's life cycle as a holistic dynamic network flow problem, costs associated with developing and operating the system should be added, see Equations 1 and 2. Then the element of time is added to each link. The costs associated with operating each system configuration ($C_D$, $C_F$, $C_V$) on the static network above can be coded into the network as follows:

Let N represent the static switching network defined above (FIG. 2) consisting of a set of nodes (point designs) $P_0$, $P_1$, $P_2 \ldots, P_n$ and oriented arcs associated with switching costs, $C_{SW}(i,j)$. Let $P_{ij}$ represent the directional arc from node $P_i$ to node $P_j$. Associate the self-loops (that is, all arcs from a node to itself $P_{ii}$) with the sum of fixed recurring and variable recurring cost elements for that configuration, i.

$$P_{ii} = C_{Fi} + \sum_{j=1}^{T} C_{Vi}(D_{i,j}) \text{ (undiscounted)} \quad (4)$$

Figure 3:
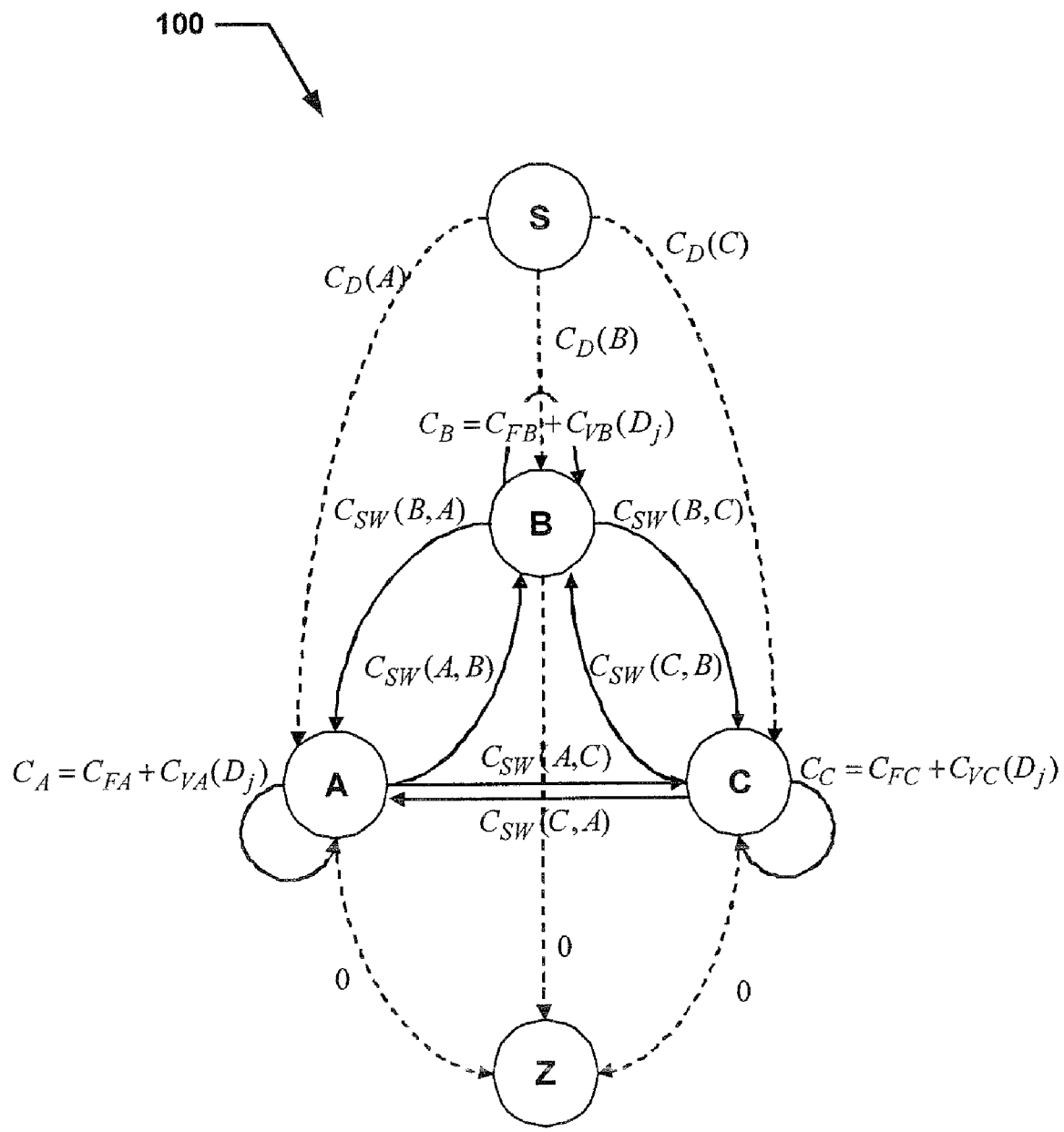
FIG. 3 depicts a graph of a complete static network.

Now a source node S and a sink node Z are created and connected to all nodes with appropriate directional arcs. All arcs $P_{sj}$ flowing from the source to the point designs are associated with the development cost of design j, $C_{Dj}$. This represents the RDT&E cost of the initially chosen configuration. All arcs flowing from point designs to the sink $P_{jz}$ are associated with the cost=0. If this cost is set to a non-zero value it represents the retirement cost of that system. The result is a static network with all information relevant to the life-cycle cost, as a function of demand, encoded in the arcs as shown in the state network graph 100 of FIG. 3.

One goal of the TDN is to capture the cost of operating and switching system configurations through time, seeking least-cost paths through the network as a function of changing operational requirements such as demand. The network 100 of FIG. 3 captures all possible development paths during a system's life cycle assuming the set of configurations represented in the initial static network, but it is not dynamic—that is, it does not include the element of time. The introduction of time into a directed network transforms it into a minimum dynamic network flow problem. The generic problem involves finding min or max-cost flows from a source, S, to a sink Z, in a directed network with transversal costs, c. Dynamic network flow problems further associate each arc with two variables: traversal cost, c, and a traversal time t.

Often the reformulated objective is to find the maximum flow that can be sent through the network in time T, where costs represent maximum capacity.

Dynamic network flow problems can be solved by reformulating the dynamic network 100 into a time-expanded static network, and then solving a traditional max or min cost flow problem on the resulting static network. A time expanded network splits the problem into T time periods, with each node (except the source node S and the sink node Z) in the original network duplicated every time period. Arcs connect the nodes depending on traversal period, and the new network contains only cost information for each arc. Methods to reformulate static networks into time-expanded networks are well established. We first divide the life cycle into T time periods and associate each arc with a traversal time, t. For simplicity and generality, let us assume here that each arc in the network (switching or staying) takes exactly one time period $\Delta T$ to traverse. Each node in the static network is duplicated in each time period, and arcs between these nodes are expanded through the new network based traversal times, t.

Figure 4:
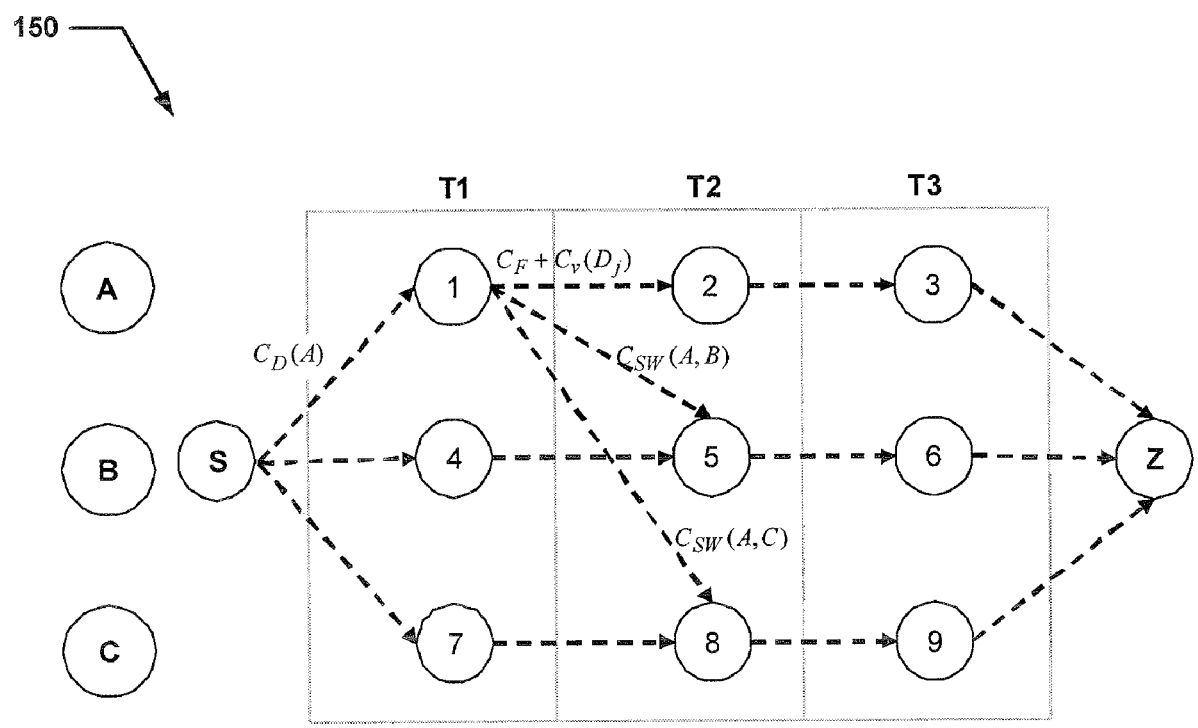
FIG. 4 depicts a graph of an initial time-expanded static network.

The static network created by hypothetical system configurations A, B, C, is expanded into a time-expanded network 150 (FIG. 4) over three time periods, T1, T2, T3. It is assumed the traversal time associated with each arc is exactly one time period $\Delta T$. Flow starts at the start node, S, and ends at the end node, Z. It should be noted that while FIG. 4 only shows switching costs associated with node 1, every node has switching costs associated therewith.

This represents the development alternatives and costs over a life-cycle, given three system configurations, A, B, C, and our four elements of cost ($C_D$, $C_F$, $C_V$, $C_{SW}$), however, one critical element is still missing: if a path through the network includes a switching arc, the "operating arc" during that time period will have been avoided. In other words, a min-cost flow through the above network can selectively choose to avoid periods of high-demand by switching before them. In reality, an existing system will continue to operate to meet existing demand while a new system configuration is being developed.

Figure 5:
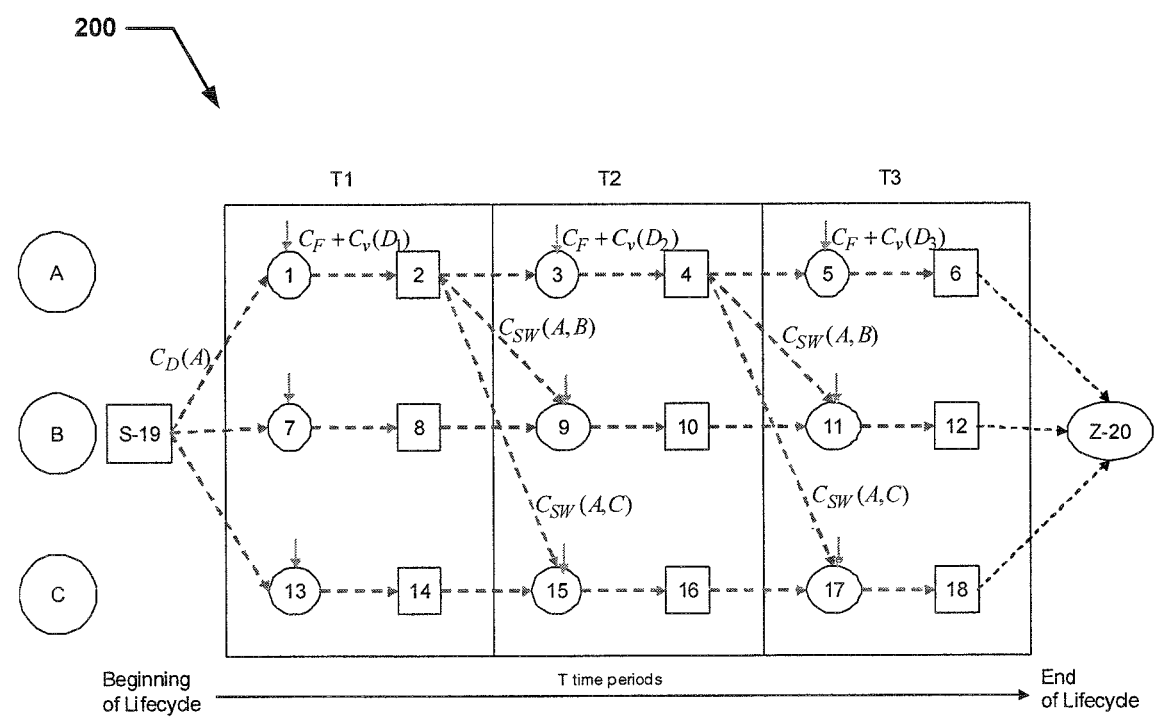
FIG. 5 depicts a graph of a time-expanded static network including costs of operating the system.

We therefore introduce a final distinction, taking a cue from decision theory, between chance nodes and decision nodes, and thereby decoupling operating costs from switching periods. This is done by splitting each time period with chance nodes at the beginning, and decision nodes at the end. Fixed and recurring costs are incorporated into the sub-arcs following the chance nodes at the beginning of each time period (referred to herein as chance arcs). Switching costs on the other hand are incorporated into the arcs following the decision nodes at the end of each time period (referred to herein as decision arcs). The chance arcs represent the costs of operating the system in configuration i at a level of demand, $D_{i,j}$, in time period $T_j$. The resulting time-expanded network 200 is shown in FIG. 5.

Figure 6:
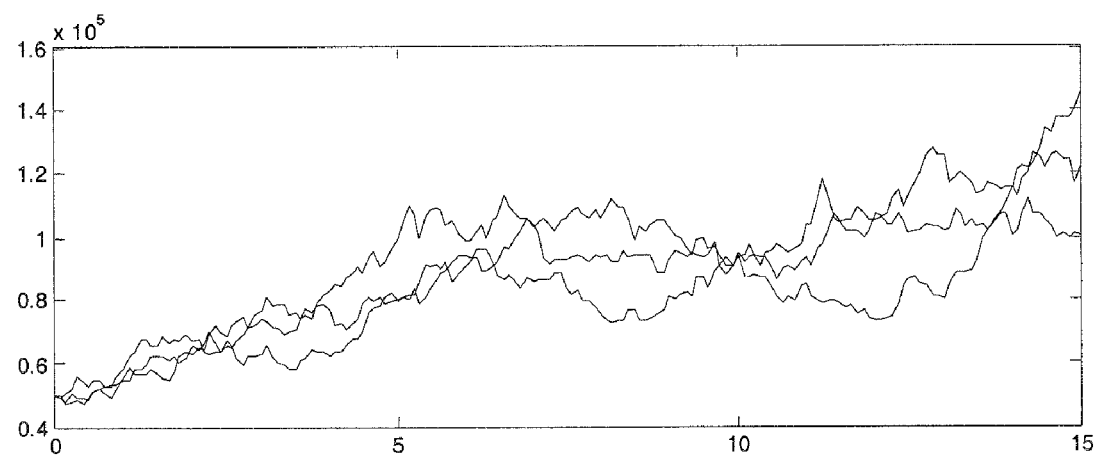
FIG. 6 depicts a graph showing different demand scenarios.

It is now possible to introduce operational scenarios over time, by changing the cost of traversing the chance arcs as a function of operational demand and by creating various demand scenarios. Demand scenarios can be discrete, involving levels of demand at each period, or probabilistic. A simple way to examine the space of demand possibilities is to create a number of discrete demand profiles that are likely to occur over time (i.e. steadily rising demand, constant demand, falling demand, and a limited combination of the three) and applying these to the network. Another way involves modeling using Geometric Brownian Motion (GBM), and applying multiple combinations of demand scenarios 250 shown in FIG. 6. In FIG. 6 a Geometric Brownian Motion (GBM) model of uncertain demand is shown wherein $\Delta T=1$ month, $D_o=50,000$, $\mu=8\%$ p.a., $\sigma=40\%$ p.a. for three scenarios.

An important point with respect to the TDN methodology is that these costs can be calculated using separate and standard cost models and then used as inputs to the time-expanded network. That is, the total cost of operating in each time period can be computed as a function of the demand scenario and the particular present state (configuration) of the system, and then these costs can be used as the cost of traversing the chance arc in that time period.

The ultimate goal for the simulation is to find the set, or sets, of designs that minimize life cycle cost under various demand scenarios. By extension, another goal is to identify exactly where lowering switching costs may maximize adaptability. The set may, or may not include more than one point design, depending on the relevant ratios of the four cost elements ($C_D$, $C_F$, $C_V$, $C_{SW}$) and the demand at each time period. In other words, this may or may not involve switching from one design to another during the lifecycle.

Once the costs of operation are coded into the chance arcs of the time-expanded network, finding least-cost paths involves implementing standard network optimization algorithms. If no loops exist in the network, as in FIG. 5, nodes can be order topologically—that is, ordered in terms of how far they are from the source. When this is the case, a simple reaching algorithm can be used to find the shortest path. The reaching algorithm is used in this example. For each operational scenario a different path through the TDN may be optimal. The TDN method allows identifying those configurations A, B, C . . . that are most often chosen as initial configurations as well as those switches i→j that are selected most often to switch among these configurations.

Once formulated, the time-expanded decision network model is a powerful tool to help formulate and refine initial point designs as well as identify opportunities for commonality and real options among these configurations. A real option is simply a feature that is embedded in an initial design configuration to lower future switching costs. The TDN can be used in many different ways to creatively identify point designs that may lower future operating costs. By combining myriad demand scenarios and network optimization algorithms, designers can selectively tweak elements of point designs, increasing and decreasing commonality, to see exactly how this affects least-cost operating and development paths through the network. As will be illustrated in the example below, this information can be used to exploit high-leverage switches, that can serve to open vast new operating spaces that would never have been exploited had switching options not been incorporated into previous designs.

In order to provide an example of TDN, the application of TDN to the design of heavy lift launch vehicles will be described. While the example utilizes launch vehicle design and operations, it should be understood that the invention has uses in other areas, including, but not limited to, the following:

Systems for complex electro-mechanical products, from microchips to automobiles, must resolve a host of often conflicting design requirements in catering to one of many potential target markets. Concepts default to address these issues such as flexible platforming and adaptation to dynamic market segments can be handled more rigorously with the TDN methodology.

Traditional building architecture used to find the program for a building is driven by its initial use. This is true for residential construction but also for many public places and commercial office buildings. Increasingly, however, there is a realization that building uses change over time and that, in order to reduce future remodeling cost, buildings can be deliberately designed to be evolvable over time.

Many large-scale infrastructure projects from electricity grids to water and gas pipelines, involve networked structures providing services to diverse populations over long life cycles. These structures exhibit significant lock-in, with serious consequences if the nature and amount of demand cannot be met. TDN can help design responses to critical scenarios and develop networks with better-evolved reaction to match shifts in demand.

Airlines create networks of transportation which are shaped by, but also shape, patterns of demand. Decisions affect both the network structure and vehicle fleet selection that are inter-dependent, and create significant path-dependence for airlines. TDN can help create a mix of fleet selection, routing, and maintenance strategy which allows for appropriate flexibility in the face of changing demand.

Companies in multiple industries face the problem of capacity planning under uncertainty. Once built, factories create a specific fixed and in variable cost structure in the face of shifting demand, with significant impact on a company's bottom line. Often, factors in the environment which indicated a given factory in a given location at an earlier time would benefit from change at a later time, leaving companies with the decision to operate at lower margins or write-off the sunken investment. TDN can be used to design both the factories themselves, and select factory locations, in a way which allows for greater flexibility and profitability over the life cycle.

Design and acquisition decisions are also dependent on a host of contracts and legal constraints among developers, acquirers and operators. Whether for system design, or even in purely business matters, contracts are designed to create lock-in using the legal system in order to change the incentive structures (costs of switching) among contracting parties. Contracting decisions which affect the evolution of a system, or business process, can be made more rigorous by explicitly incorporating the cost of switching, even if the latter are purely legal costs. The TDN methodology can thus be applied in the area of pure business strategy and contracting.

Example of TDN Application

The TDN method described above has been programmed as a functional Matlab tool and applied to the problem of designing an "evolvable" Heavy Lift Launch System (HLLV) for NASA's Space Exploration Vision. For this problem, four different initial vehicle configurations were created—one clean sheet design, one based on Evolved Expendable Launch Vehicles (EELV) and two based on Shuttle-Derived vehicle alternatives—and related cost elements and switching costs were computed. The methodology was run using ten plausible scenarios for Lunar and Mars exploration campaigns, and total life-cycle costs were calculated. Initial results demonstrated preferred vehicle configurations, and iterative methods quantified the exact value of lowering switching costs under a uniform probability distribution.

Figure 7:
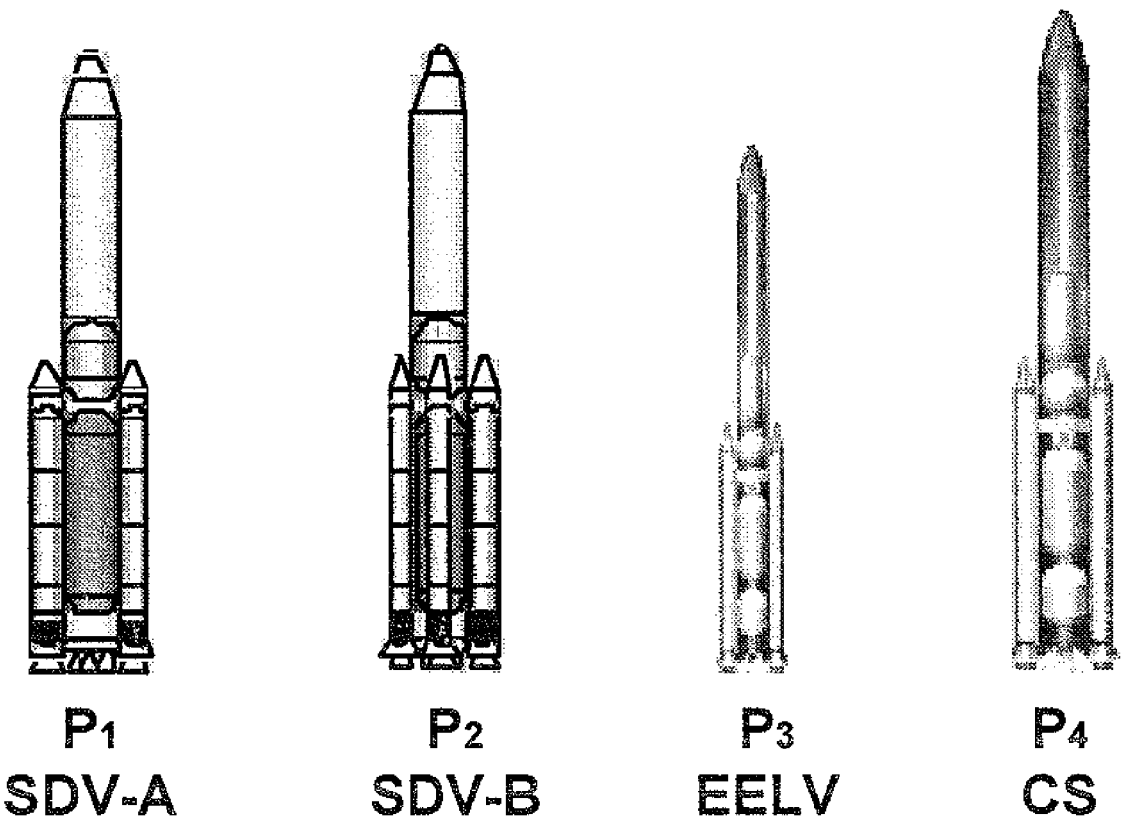
FIG. 7 is a diagram showing four different launch vehicles.

The model was implemented using four point designs of interest to NASA during the heavy lift launch decision (FIG. 7). The four point designs include:

$P_1$—a Shuttle Derived Inline Heavy Lift Vehicle 302, with 3 Space Shuttle Main Engines; 2 four segment solid rocket boosters; Performance: 80 metric tons to low earth orbit;

$P_2$—a Shuttle Derived Inline Heavy Lift Vehicle 304; with 3 Space Shuttle Main Engines; 4 four segment solid rocket boosters; Performance: 115 metric tons to low earth orbit;

$P_3$—an Evolved Expendable Launch Vehicle (EELV) derived rocket 306; with Delta V core; 2 Zenith boosters; Performance: 62 metric tons to lower earth orbit; and $P_4$—a Clean Sheet Heavy Lift Vehicle 308; Performance: 105 mt to low earth orbit.

Figure 8:
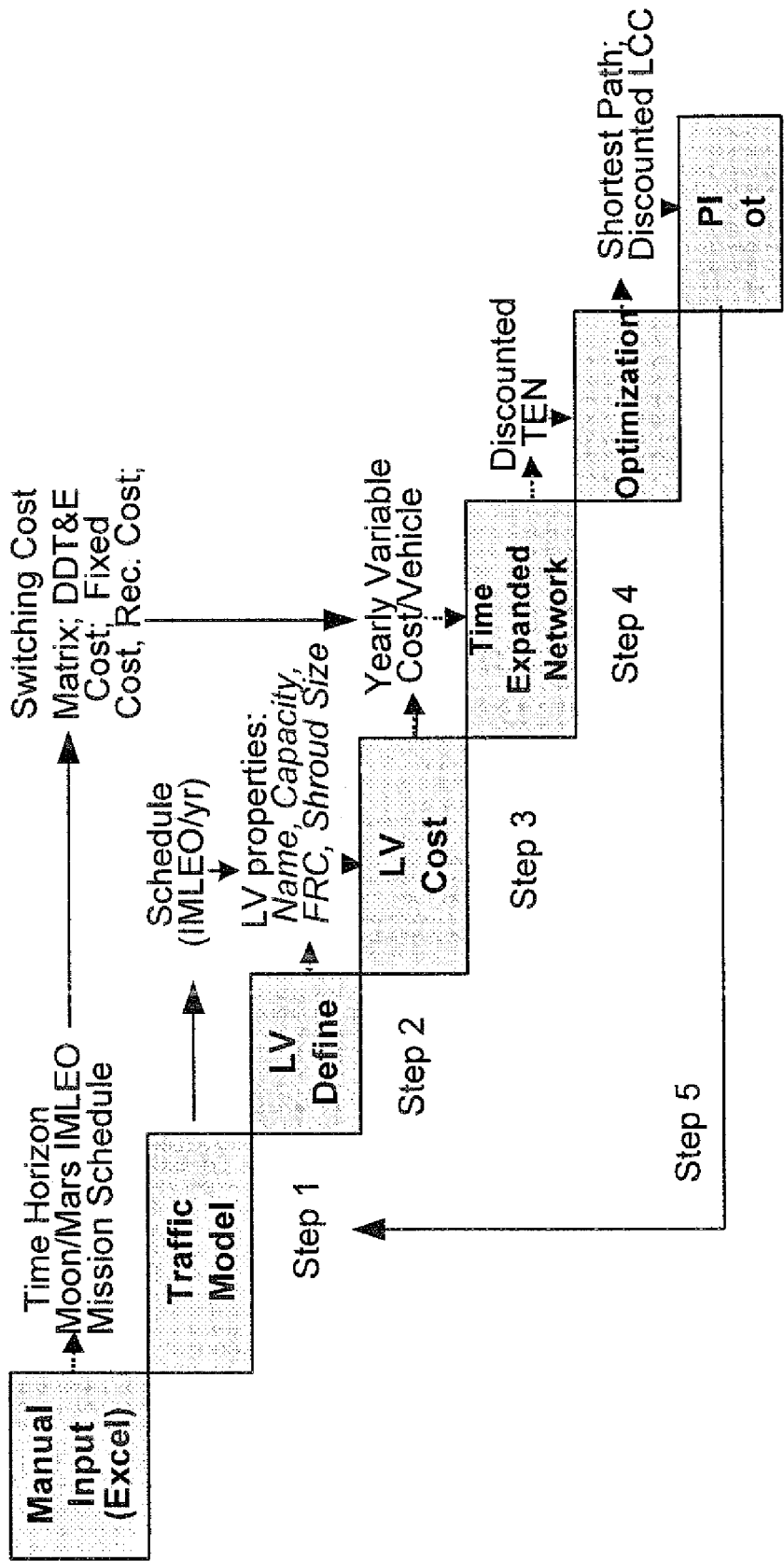
FIG. 8 depicts an $N^2$ diagram showing different subsystems comprising the launch vehicle design model.

After performance and risk were estimated for each configuration, the first step of the TDN process involved estimating development costs for all four vehicles as well as fixed and recurring operating costs as a function of demand. In this case, this was done by NASA and supplemented by the authors using traditional cost-estimating tools. An $N^2$ diagram showing the integrated launch vehicle model is shown in FIG. 8. The model takes the time horizon (number of time steps), required injected-mass in Low Earth Orbit (IMLEO) and mission schedule as an input. It then generates 10 different traffic models, computes the launch vehicle properties for every one of the four configurations shown in FIG. 7 and proceeds with the other five (5) steps of the TDN method shown in FIG. 1.

This includes calculating switching costs between the vehicle configurations shown in FIG. 7. As noted above, this depends crucially on the amount of commonality between the systems and any real options (reserved interfaces, extra margins . . . ) embedded in them. Systems can share subsystems at different levels. For example, Shuttle-derived vehicles and EELV derived vehicles might be designed to use common large-scale subsystems such as launch pads, with minor alterations. At a deeper level, two shuttle derived vehicles might share almost all first order subsystems—launch pads, manufacturing facilities, rocket boosters, main engines—with alterations only to specific second-order subsystems—i.e. the external fuel tank. To calculate switching costs, then, the system is broken into its constituent subsystems to identify commonality at the appropriate level.

To take one example of how point designs can involve commonality at a level deeper than the major subsystem level, imagine four shuttle-derived point designs (FIG. 9): A sidemount configuration with four segment solid rock boosters (SRB); A side mount configuration with five-segment SRBs; An inline vehicle with 4-segment SRBs; and an inline launch vehicle with 5-segment SRBs. Each of these system pairs has commonality in a different way—some share the same solid rocket boosters, others are inline. Calculating switching costs between these systems demands examining how their common elements affect subsystem design.

FIG. 8, the $N^2$ diagram demonstrates how this switching cost information is first obtained by decomposing major subsystems and examining how they affect facility design. In this case some facilities are common and some facilities must be alternated to create either four or five segment SRBs, and similarly some must be altered to create inline or side mount vehicles. These elements are not mutually exclusive and therefore the switching costs between each system must take into account what is already built and what has yet to be built. This information is then injected in step 4 of the TDN method shown in FIG. 8. In the TDN method the resulting switching costs 400 between systems 1, 2, 3, and 4 are presented in FIG. 9.

Figure 10:
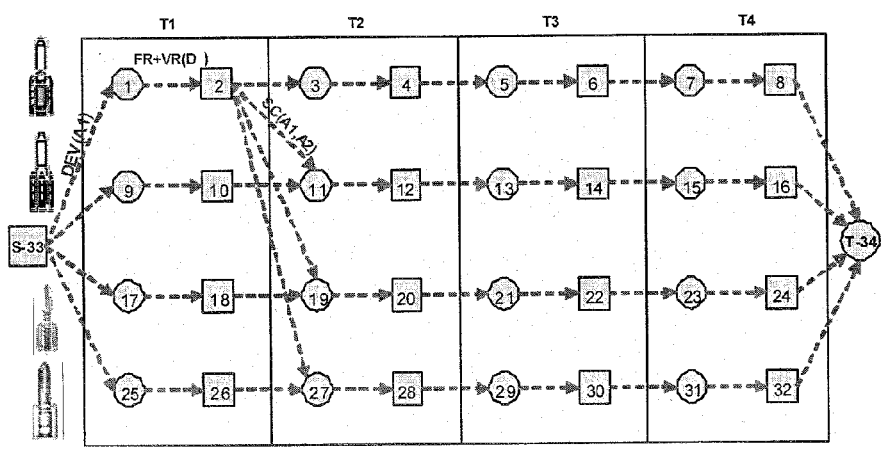
FIG. 10 depicts a diagram showing a time-expanded network for different demand scenarios.

Once the four cost elements were determined, the time-expanded network was created (FIG. 10). In this case we had four system configurations and divided the time horizon for it in to four periods. Ten demand scenarios were created. Modeling demand is a complex process and can be done in many different ways. Demand in this case involves how many tons of payload need to be shipped to low-earth orbit (LEO) per time period and how many launches this would necessitate. NASA is principally concerned with returning to the Moon and possible sending missions to Mars, therefore, variations in kind and timing of Lunar and Mars missions were translated to launch-vehicle demand. Next, ten scenarios were developed based on how many lunar and Mars missions might be launched during each time period and this was translated to different numbers of launches for each vehicle and, by extension, different patterns of operations costs along the chance arcs in the time-expanded network (FIG. 10).

Figure 11:
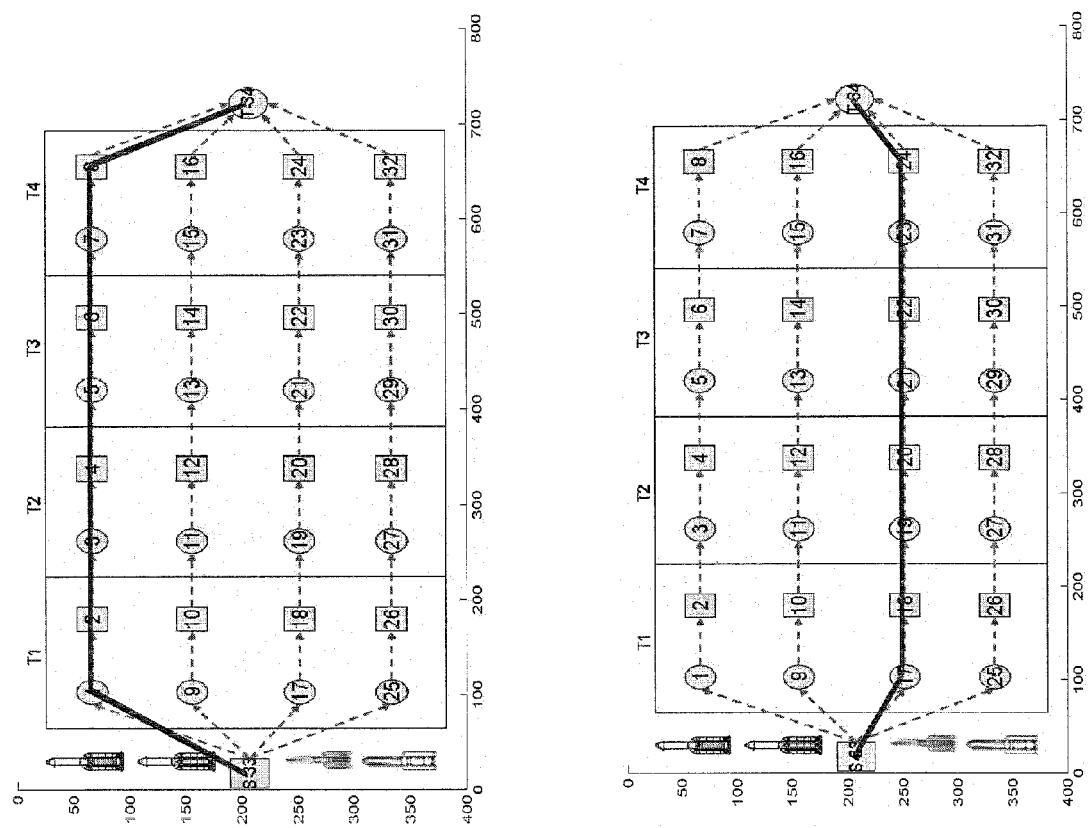
FIG. 11 depicts a diagram showing the two shortest paths through the time-expanded network.
Figure 12:
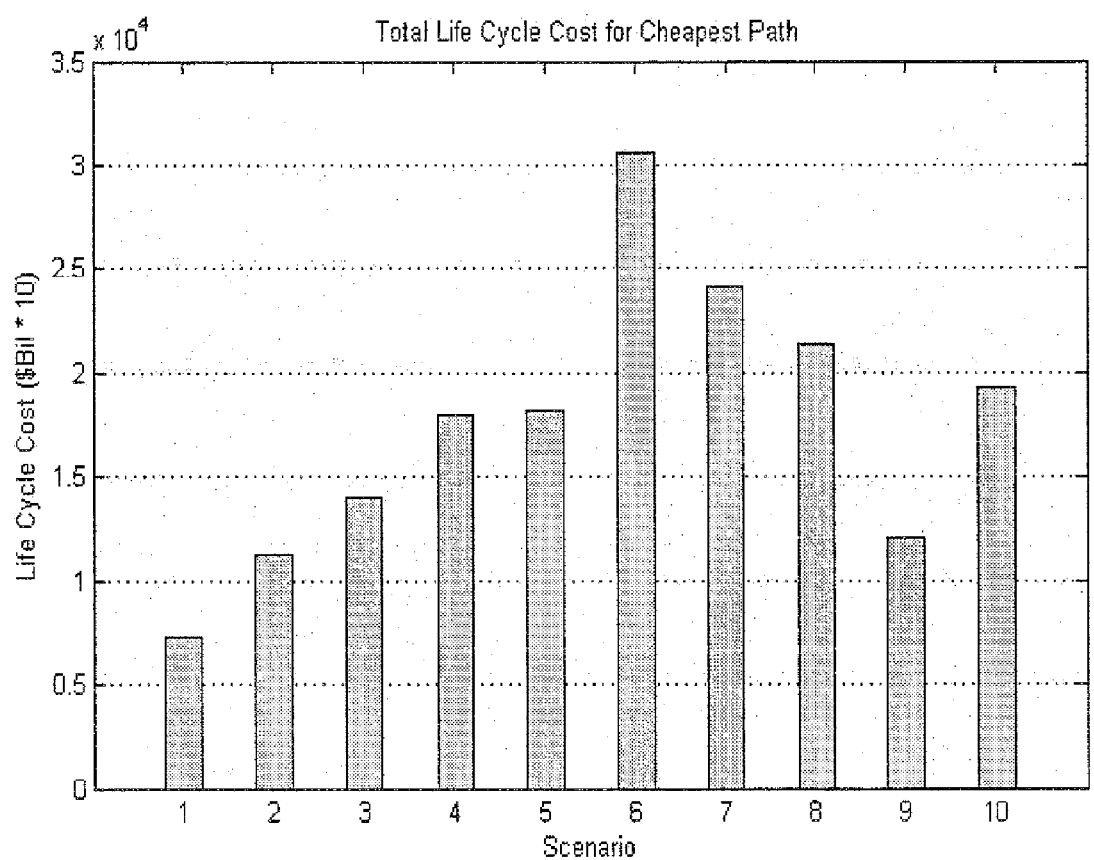
FIG. 12 is a graph showing the life-cycle costs predicted for each scenario.

Once the demand scenarios we created and the resulting operations costs coded into the network the network optimization algorithm was run for each scenario. The result was ten different shortest paths through the life cycle, as a function of each demand scenario. It was found that only two vehicle configurations (1 and 3) were ever used and that, moreover, no switches were ever used. FIG. 11 illustrates the two shortest paths, and FIG. 12 shows the total life-cycle cost predicted for each scenario. It should be noted that the optimal path need not be based on costs, but could also be based on other factors, including but not limited to, revenue and non-financial metrics such as utility.

The results demonstrated that two vehicles (configuration 1 and 3, respectively) were optimal under different operating regimes and immediately raised the question: Would it be worthwhile to decrease the switching costs between these two vehicles and, if so, how much should be paid to do this? Therefore the switching costs were systematically lowered between these two vehicles manually, in order to determine (a) at what switching cost level did switching start to occur under each demand scenario and (b) what were the savings, if any, in total life cycle cost.

Figure 13:
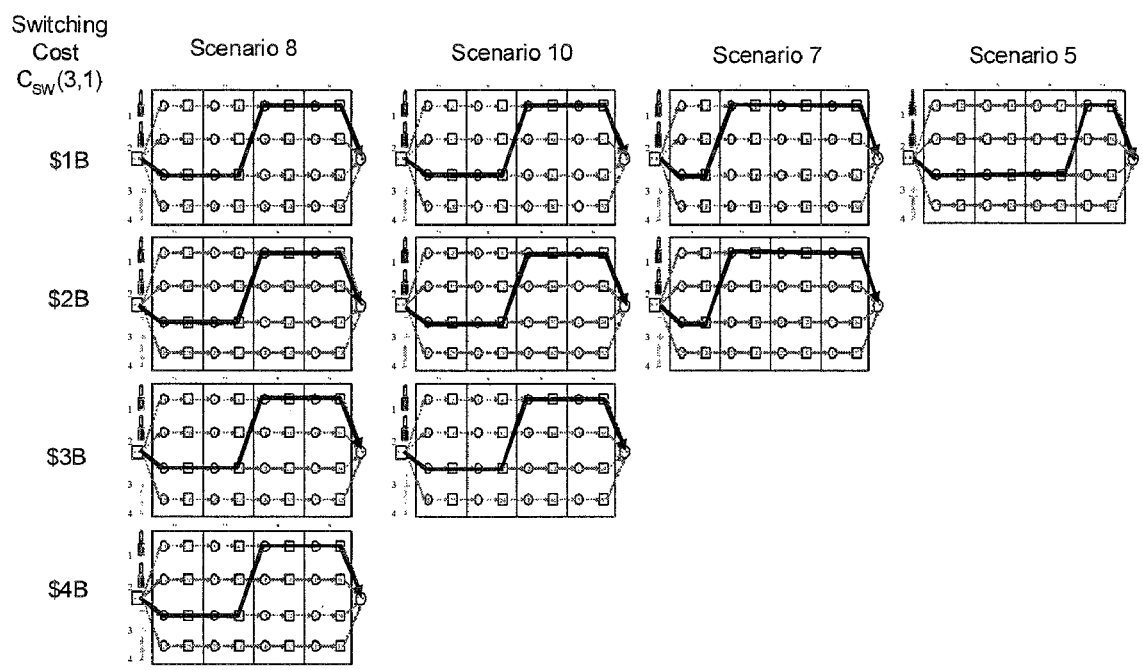
FIG. 13 is a diagram showing different scenarios for a variety of switching costs.

More specifically, the cost of switching from the EELV-derived vehicle (small launch vehicle used initially for Moon missions) to the shuttle-derived SRB vehicle (larger vehicle used for Mars missions later) was systematically lowered from $4 billion dollars to $1 billion to determine how much this would change the path taken over the life-cycle of the system. The results are summarized in FIG. 13. It was found that if the switching cost is set to $4 billion, one switch is made in scenario 8 from configuration 3 to configuration 1 after 2 time periods—this is a scenario where we encounter few lunar missions initially and many Mars missions later. As the switching cost is lowered further, switches also occur in other scenarios. In the case where switching costs are as low as $1 billion, switching occurs in scenarios 5, 7, 8 and 10.

The actual benefit of lowering switching costs depends on the exact scenario that ends up occurring in the future. The simulations demonstrated that if scenario 8 did occur, that a switch between the vehicles occurs even at a relatively high switching cost. This implies that if scenario 8 were to occur, the savings of lowering switching costs between these vehicles would be high. Another way to present this, however, is to determine how much is saved in terms of expected-cost if each scenario is equally likely—in this case there are ten scenarios, so each scenario would have a 10% chance of occurring.

Figure 14:
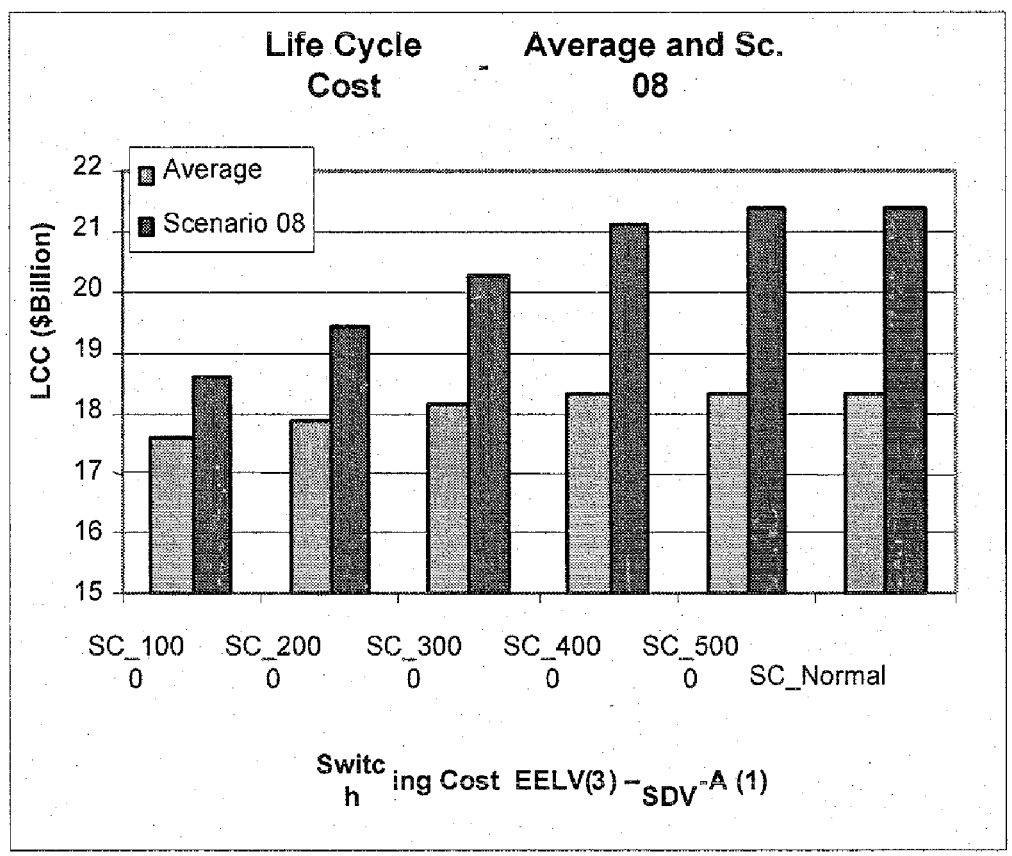
FIG. 14 is a diagram showing life cycle costs as a function of switching costs.

FIG. 14 illustrates the total life-cycle cost in $ billions as a function of the switching cost between vehicles 3 and 1, both for scenario 8 in particular and for the case where every scenario is equally likely. SC_Normal is the original case (with switching costs shown in Table 2), so it should be used as the baseline. The results demonstrate that indeed, savings are greatest if scenario 8 occurs, but that there are also LCC savings on average across all scenarios.

TABLE 2

Switching Costs ($M) between four launch vehicles

| Switch Costs | 1 | 2 | 3 | 4 |
|---|---|---|---|---|
| 1 | 0 | 2285 | 4600 | 8900 |
| 2 | 0 | 0 | 4600 | 8900 |
| 3 | 6718 | 8848 | 0 | 8900 |
| 4 | 6718 | 8848 | 4600 | 0 |

Figure 15:
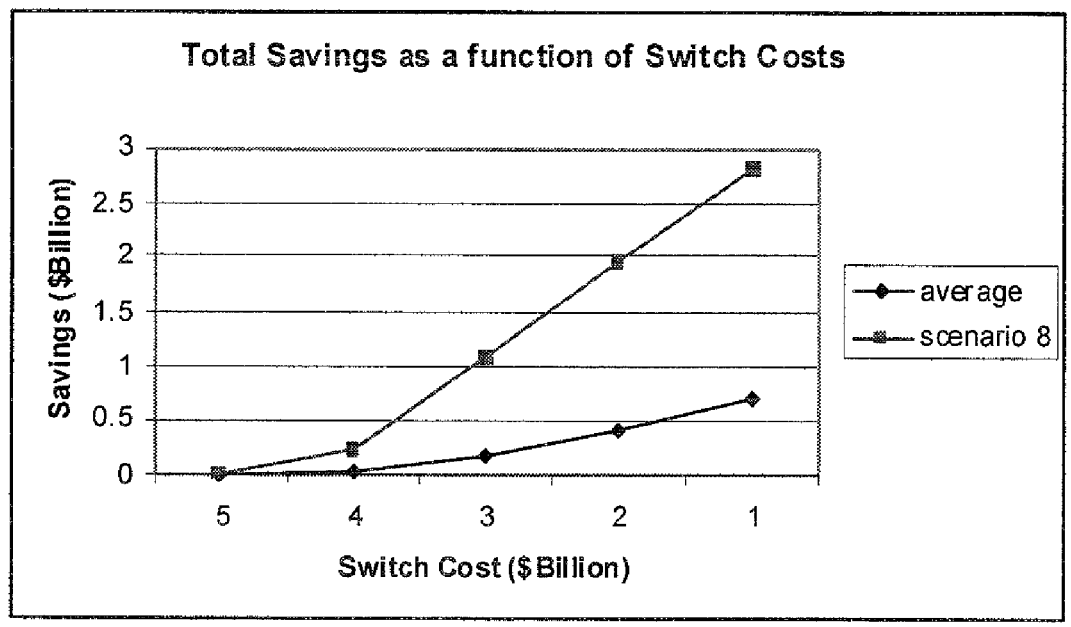
FIG. 15 is a graph showing the amount of money saved as switching costs are lowered.

FIG. 15 makes this even more apparent. It shows the exact amount saved as switching costs are lowered between the two most-used vehicles. If all scenarios are equally likely, then up to $600 million can be saved by lowering the switching costs to $1 billion dollars. If it is thought that scenario 8 will probably occur, as much as $2.8 billion can be saved by lowering the switching cost between configurations 3 and 1 to $1 billion. This, therefore tells exactly how much should be paid to lower the switching costs to those desired numbers. This in a way is the maximum price one would be willing to pay on a real option that allows (but doesn't require) switching from configuration 3 (EELV) to 1 (SDV) at a later date. If it is cheaper to lower the switching costs than not to switch and incur future costs due to inefficiency, then the switching costs should be lowered. If this is not the case, then it makes more sense to keep the switching costs where they are. Two final points should be noted. First, one can weight scenarios individually rather than resorting to averages. Second, lowering the switching cost might change the performance characteristics of the system, and therefore change the life-cycle costs. This should be taken into account during iterative design, specifically the outer iteration loop between steps 5 and 1 shown in FIG. 1.

TDN represents an advancement over similar methods to design and analyze system flexibility. First it is formulated to enable designers to explicitly address the problem of high switching costs, a principal cause of architectural lock-in, early in the design process in a clear and rigorous manner. Second, by exploiting the inherent structure of the time-expanded graph, TDN overcomes the problem of exponentially branching development options, a serious impediment to the practical implementation of both Real Options and Decision Theory-based design methods. In this way, TDN reformulates life-cycle evaluation as a network optimization problem with clearly defined user inputs. Third, TDN enables quantitative, user-directed scenario planning Fourth, TDN lends itself easily to implementation as an iterative computational tool, reducing the cognitive load on system designers and allowing them to concentrate on design alternatives, switching options and development scenarios. Finally, the method is generic, being applicable to any systems and sub-systems where architectural lock-in and high-switching costs are a problem. Examples of applications that could use TDN would be the design of a factory under uncertain capacity requirements, or fleet acquisition for an airline under uncertain traffic models. Additional examples of TDN application are given above.

The generic modeling framework described above can be implemented in many different ways based on specific modeling demands. Classic Shortest Path Algorithms assume perfect information about future operating costs. In reality operators may not know what operating scenarios will exist in the future. This can be taken into account by revising the shortest path algorithms and only taking into account fewer future time periods. However, one must be careful in implementing this, as the goal for the model is to increase system flexibility and not to recreate an operating environment per se. It is likely what is needed early on is an assumption of complete information together with the most likely demand scenarios, to identify how to maximize useful switches. One can split the life cycle into an arbitrary number of time units with each time unit representing an arbitrary amount of real-world time. Switching times can be modeled in similar ways to classic "Project Cost Curve" problems. In these it is generally assumed that a project is an ordered set of jobs. Each job has an associated normal completion time and a crash completion time, and the cost of doing the job (in our case, making the switch) varies linearly between these two times. One may want to operate more than one kind of a system at time. This can be done by sending more than one unit of flow through the network.

TDN developed from the realization that, if properly framed, switching costs between system configurations define a network whose nodes are point-designs and arc-costs are both operating and switching costs. Using concepts from operations research, this "static network" can be expanded into a "time expanded network" in order to model a complete life cycle. The time expanded network provides a compact representation of all possible development paths for the set of point designs, and thus avoids exponentially branching development options often encountered in traditional decision theory. Used in conjunction with established cost modeling techniques including the estimation of fixed and variable operating costs, the time-expanded network model can be implemented as a software tool and used iteratively to identify optimal switches and design increasingly complex evolvable systems.

Figure 16:
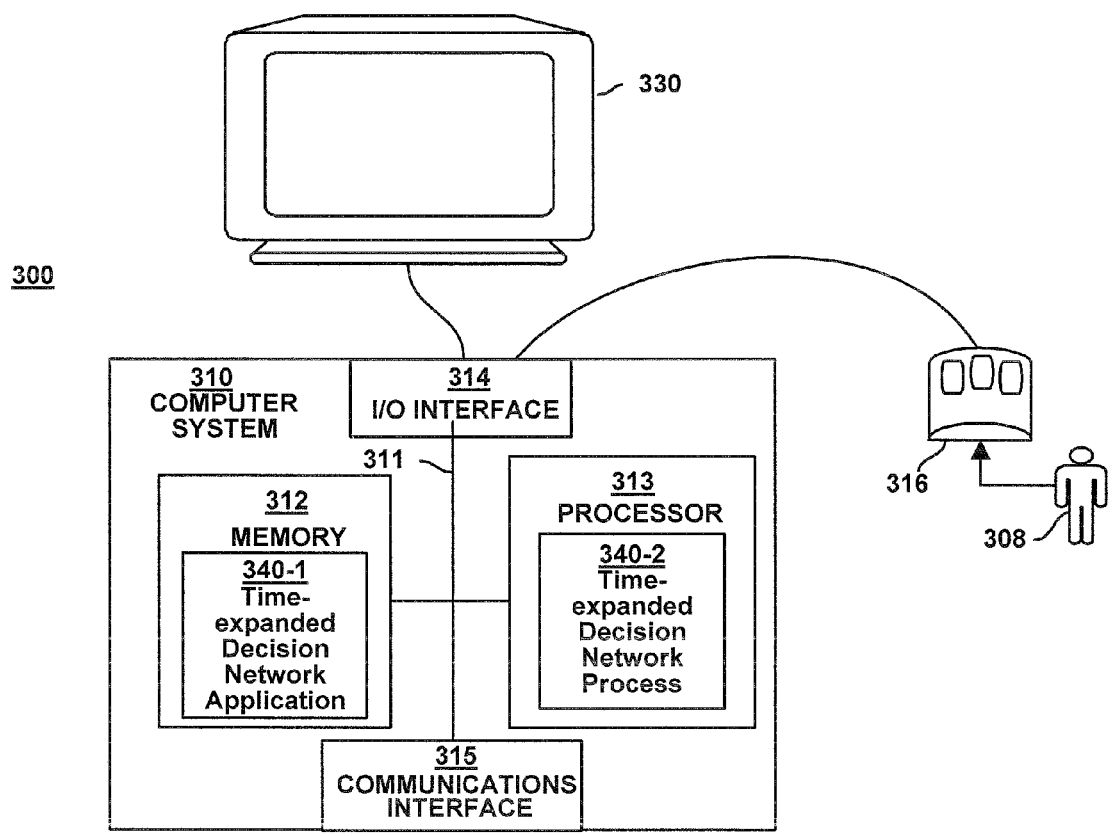
FIG. 16 illustrates an example computer system architecture for a computer system that provides for determining and utilizing a time-expanded decision network in accordance with embodiments of the invention.

FIG. 16 is a block diagram illustrating an example computer system 300 for implementing time-expanded decision network function 340 and/or other related processes to carry out the different functionality as described herein.

As shown, computer system 300 of the present example includes an interconnect 311 that couples a memory system 312 and a processor 313 an input/output interface 314, and a communications interface 315.

As shown, memory system 312 is encoded with the time-expanded decision network application 340-1 described above. Time-expanded decision network application 340-1 can be embodied as software code such as data and/or logic instructions (e.g., code stored in the memory or on another computer readable medium such as a disk) that support functionality according to different embodiments described herein.

During operation, processor 313 of computer system 300 accesses memory system 312 via the interconnect 311 in order to launch, run, execute, interpret or otherwise perform the logic instructions of the time-expanded decision network application 340-1. Execution of time-expanded decision network application 340-1 produces processing functionality in time-expanded decision network process 340-2. In other words, the time-expanded decision network process 340-2 represents one or more portions of the time-expanded decision network application 340-1 (or the entire application) performing within or upon the processor 313 in the computer system 300.

It should be noted that, in addition to the time-expanded decision network process 340-2, embodiments herein include the time-expanded decision network application 340-1 itself (i.e., the un-executed or non-performing logic instructions and/or data). The time-expanded decision network application 340-1 can be stored on a computer readable medium such as a floppy disk, hard disk, or optical medium. The time-expanded decision network application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of time-expanded decision network application 340-1 in processor 313 as the time-expanded decision network process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. The communications interface 315 may carry inputs and outputs generated by the 340-2 Time-Expanded Decision Network Process to other computers systems, including those located and communicating over the Internet. As such the TDN process 340-2 may be provided as a computer software program or as a web service over the Internet.

References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, USB solid state memory device, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method comprising:
designing, by a computer, a set of feasible system configurations;
quantifying, by a computer, switching costs among said system configurations;
creating, by a computer, a static network defining said system configurations by quantifying said switching costs;
creating, by a computer, a time expanded network based on said static network;
creating, by a computer, operational scenarios for said time expanded network;
evaluating, by a computer, optimal paths through said time expanded network; and
modifying, by a computer, system configurations to leverage easier switching between said system configurations; and
wherein the costs associated with running each system configuration are coded in accordance with the equation $$P_{ii} = C_{Fi} + \sum_{j=1}^{T} C_{Vi}(D_{i,j}).$$

2. The method of claim 1 wherein said designing a set of feasible system configurations include research, design, development, testing and evaluation costs (RDDT&E); fixed recurring costs during operations; and variable recurring costs.

3. The method of claim 2 further comprising determining a life cycle cost in accordance with the equation $$C_{LCi}(D, T) = C_{Di} + C_{Fi} \times T + \sum_{j=1}^{T} C_{Vi}(D_{i,j})$$

wherein $C_{LCi}(D, T)$ is the estimated life cycle cost, i is a given design configuration, $C_{Di}$=cost of research, design, development, testing and evaluation (RDT&E) for a given design configuration, $C_{Fi}$ is the fixed recurring cost per time period for a given design, $C_{Vi}$ is the variable cost as a function of demand for a given design, T is the number of periods and $D_{i,j}$ is the demand in each period.

4. The method of claim 3 wherein said determining a life cycle cost further includes the time value of money, such that said life cycle cost is determined in accordance with the net present value equation $$C_{LCi}(D, T) = C_{Di} + \sum_{j=1}^{T} \frac{C_{Fi} + C_{Vi}(D_{i,j})}{(1+r)^j}.$$

5. The method of claim 1 wherein said switching costs include technical cost associated with altering and producing at least one of a group consisting of a new configuration and technology.

6. The method of claim 5 wherein said technical costs of switching ($C_{SW}$) from a first configuration (A) to a second configuration (B) is performed in accordance with the equation $$C_{SW}(A, B) = C_{DEV}(B) + C_R(A)$$

wherein $C_{DEV}$ comprises the cost of designing, building and testing a new system and wherein $C_R$ comprises the cost of retiring the old system.

7. The method of claim 1 wherein said optimal path through the time expanded network comprises at least one of the group consisting of a minimum path through said time expanded network, a maximum path through said time-expanded network and a shortest path through said time expanded network.

8. The method of claim 1 wherein said optimal path relates to at least one of the group consisting of cost, revenue, and non-financial metrics.

9. A non-transitory computer readable medium having computer readable code thereon for determining and utilizing a time-expanded decision network, the medium comprising:
  instructions for designing a set of feasible system configurations;
  instructions for quantifying switching costs among said system configurations;
  instructions for creating a static network defining said system configurations by quantifying said switching costs;
  instructions for creating a time expanded network based on said static network;
  instructions for creating operational scenarios for said time expanded network;
  instructions for evaluating optimal paths through said time expanded network;
  instructions for modifying system configurations to leverage easier switching between said system configurations; and
  wherein the costs associated with running each system configuration are coded in accordance with the equation $$P_{ii} = C_{Fi} + \sum_{j=1}^{T} C_{Vi}(D_{i,j}).$$

10. The computer readable medium of claim 9 wherein said instructions for designing a set of feasible system configurations include research, design, development, testing and evaluation costs (RDDT&E); fixed recurring costs during operations; and variable recurring costs.

11. The computer readable medium of claim 10 further comprising instructions for determining a life cycle cost in accordance with the equation $$C_{LCi}(D, T) = C_{Di} + C_{Fi} \times T + \sum_{j=1}^{T} C_{Vi}(D_{i,j})$$

wherein $C_{LCi}(D, T)$ is the estimated life cycle cost, i is a given design, $C_{Di}$=cost of research, design, development, testing and evaluation (RDDT&E) for a given design, $C_{Fi}$, is the fixed recurring cost per time period for a given design, $C_{Vi}$, is the variable cost as a function of demand for a given design, T is the number of periods and $D_{i,j}$ is the demand in each period.

12. The computer readable medium of claim 11 wherein said instructions for determining a life cycle cost further includes the time value of money, such that said life cycle cost is determined in accordance with the net present value equation $$C_{LCi}(D, T) = C_{Di} + \sum_{j=1}^{T} \frac{C_{Fi} + C_{Vi}(D_{i,j})}{(1+r)^j}.$$

13. The computer readable medium of claim 9 wherein said switching costs include technical cost associated with altering and producing at least one of a group consisting of a new configuration and technology.

14. The computer readable medium of claim 13 wherein said technical costs of switching ($C_{SW}$) from a first configuration (A) to a second configuration (B) is performed in accordance with the equation $$C_{SW}(A, B) = C_{DEV}(B) + C_R(A)$$

wherein $C_{DEV}$ comprises the cost of designing, building and testing a new system and wherein $C_R$ comprises the cost of retiring the old system.

15. The computer readable medium of claim 9 wherein said optimal path through the time expanded network comprises at least one of the group consisting of a minimum path through said time expanded network, a maximum path through said time-expanded network and a shortest path through said time expanded network.

16. The computer readable medium of claim 15 wherein said optimal path relates to at least one of the group consisting of cost, revenue, and non-financial metrics.

17. A computer system comprising:
a memory;
a processor;
a communications interface;
an interconnection mechanism coupling the memory, the processor and the communications interface; and
wherein the memory is encoded with an application determining and utilizing a time-expanded decision network, that when performed on the processor, provides a process for processing information, the process causing the computer system to perform the operations of:
designing a set of feasible system configurations;
quantifying switching costs among said system configurations;
creating a static network defining said system configurations by quantifying said switching costs;
creating a time expanded network based on said static network;
creating operational scenarios for said time expanded network;
evaluating optimal paths through said time expanded network;
modifying system configurations to leverage easier switching between said system configurations; and
wherein the costs associated with running each system configuration are coded in accordance with the equation $$P_{ii} = C_{Fi} + \sum_{j=1}^{T} C_{Vi}(D_{i,j}).$$

18. The computer system of claim 17 wherein said designing a set of feasible system configurations include research, design, development, testing and evaluation costs (RDDT&E); fixed recurring costs during operations; and variable recurring costs.

19. The computer system of claim 18 further comprising determining a life cycle cost in accordance with the equation $$C_{LCi}(D, T) = C_{Di} + C_{Fi} \times T + \sum_{j=1}^{T} C_{Vi}(D_{i,j})$$

wherein $C_{LCi}(D, T)$ is the estimated life cycle cost, i is a given design, $C_{Di}$=cost of research, design, development, testing and evaluation (RDDT&E) for a given design, $C_{Fi}$ is the fixed recurring cost per time period for a given design, $C_{Vi}$, is the variable cost as a function of demand for a given design, T is the number of periods and $D_{i,j}$ is the demand in each period.

20. The computer system of claim 19 wherein said determining a life cycle cost further includes the time value of money, such that said life cycle cost is determined in accordance with the net present value equation $$C_{LCi}(D, T) = C_{Di} + \sum_{j=1}^{T} \frac{C_{Fi} + C_{Vi}(D_{i,j})}{(1+r)^j}$$

21. The computer system of claim 17 wherein said optimal path through the time expanded network comprises at least one of the group consisting of a minimum path through said time expanded network, a maximum path through aid time-expanded network and a shortest path through said time expanded network.

* * * * *